United States Patent
Crowe

(10) Patent No.: US 10,149,011 B2
(45) Date of Patent: Dec. 4, 2018

(54) MEDIA CONTENT DISTRIBUTION

(71) Applicant: AT&T INTELLECTUAL PROPERTY I, L.P., Atlanta, GA (US)

(72) Inventor: Keith Crowe, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/949,222

(22) Filed: Apr. 10, 2018

(65) Prior Publication Data

US 2018/0227635 A1  Aug. 9, 2018

Related U.S. Application Data

(62) Division of application No. 14/945,036, filed on Nov. 18, 2015, now Pat. No. 9,973,816.

(51) Int. Cl.
*H04N 21/462* (2011.01)
*H04N 21/24* (2011.01)
(Continued)

(52) U.S. Cl.
CPC ....... *H04N 21/4622* (2013.01); *H04N 21/233* (2013.01); *H04N 21/2404* (2013.01);
(Continued)

(58) Field of Classification Search
CPC ......... H04N 21/4622; H04N 21/44209; H04N 21/437; H04N 21/6375; H04N 21/6143;
(Continued)

(56) References Cited

U.S. PATENT DOCUMENTS 5,913,164 A  6/1999 Pawa et al.
6,185,409 B1  2/2001 Threadgill et al.
(Continued)

FOREIGN PATENT DOCUMENTS

WO  2012142042 A1  10/2012

OTHER PUBLICATIONS

"Data Sheet: Cisco IP VSAT Satellite WAN Network Module for the Cisco Integrated Services Routers," Cisco, cisco.com, 2006, http://www.cisco.com/c/en/us/products/collateral/interfaces-modules/ip-vsat-satellitewan-module/product_data_sheet0900aecd804bbf6f.pdf, 10 pp.

(Continued)

*Primary Examiner* — Oschta I Montoya
(74) *Attorney, Agent, or Firm* — Toler Law Group, PC

(57) ABSTRACT

A method includes receiving media content at a media server and encoding the media content to form a first content stream. The method includes encoding an audio portion of the media content to form a second content stream having a first bit rate. The method includes causing the first content stream to be transmitted to a media device via a satellite distribution system and causing the second content stream to be concurrently transmitted to the media device via a terrestrial distribution system. The method includes receiving an indication of a disruption of the first content stream at the media device. The method also includes, after receiving the indication, causing a third content stream to be transmitted from the media server to the media device via the terrestrial distribution system. The third stream has a second bit rate greater than the first bit rate.

20 Claims, 6 Drawing Sheets

(51) Int. Cl.
| H04N 21/2665 | (2011.01) |
| H04N 21/233 | (2011.01) |
| H04N 21/6373 | (2011.01) |
| H04N 21/442 | (2011.01) |
| H04N 21/44 | (2011.01) |
| H04N 21/438 | (2011.01) |
| H04N 21/61 | (2011.01) |
| H04N 21/6375 | (2011.01) |
| H04N 21/437 | (2011.01) |

(52) U.S. Cl.
CPC ....... *H04N 21/2665* (2013.01); *H04N 21/437* (2013.01); *H04N 21/4383* (2013.01); *H04N 21/44004* (2013.01); *H04N 21/4424* (2013.01); *H04N 21/44209* (2013.01); *H04N 21/6112* (2013.01); *H04N 21/6143* (2013.01); *H04N 21/6373* (2013.01); *H04N 21/6375* (2013.01)

(58) Field of Classification Search
CPC ........... H04N 21/6112; H04N 21/4383; H04N 21/44004; H04N 21/4424; H04N 21/6373; H04N 21/233; H04N 21/2665; H04N 21/2404

See application file for complete search history.

(56) References Cited

U.S. PATENT DOCUMENTS

| 6,411,616 | B1 | 6/2002 | Donahue et al. |
| 6,944,139 | B1 | 9/2005 | Campanella |
| 7,245,874 | B2 | 7/2007 | Rest et al. |
| 7,356,348 | B2 | 4/2008 | Bifano et al. |
| 7,624,417 | B2 | 11/2009 | Dua |
| 7,940,694 | B2 | 5/2011 | Pusateri |
| 7,965,721 | B1 | 6/2011 | Gunasekara |
| 8,094,679 | B2 | 1/2012 | King |
| 8,396,411 | B2 | 3/2013 | Kim et al. |
| 8,472,871 | B2 | 6/2013 | Barroso |
| 8,711,854 | B2 | 4/2014 | Oran et al. |
| 9,049,346 | B2 | 6/2015 | Hasek et al. |
| 2007/0192812 | A1* | 8/2007 | Pickens .................. H04L 1/004 725/94 |
| 2008/0098436 | A1 | 4/2008 | White |
| 2009/0034633 | A1* | 2/2009 | Rodirguez ............ H04L 1/0041 375/240.28 |
| 2009/0178095 | A1* | 7/2009 | Zuo ....................... H04L 65/604 725/109 |
| 2010/0037271 | A1 | 2/2010 | Crowe |
| 2010/0313232 | A1 | 12/2010 | Norin |
| 2012/0042066 | A1 | 2/2012 | Chatterjee et al. |
| 2012/0260299 | A1 | 10/2012 | Kotecha et al. |
| 2013/0046849 | A1 | 2/2013 | Wolf et al. |
| 2014/0020036 | A1 | 1/2014 | Hasek et al. |
| 2014/0179306 | A1 | 6/2014 | Tessier |
| 2014/0189756 | A1* | 7/2014 | Beals ................. H04N 21/6193 725/68 |
| 2015/0189346 | A1 | 7/2015 | Naik Raikar |

OTHER PUBLICATIONS

Weigle, E., et al., "Peer-to-Peer Error Recovery for Hybrid Satellite-Terrestrial Networks," P2P 2006. Sixth IEEE International Conference on Peer-to-Peer Computing. IEEE 2006, http://citeseerx.ist.pus.edu/viewdoc/download?doi=10.1.1.159.5052&rep=rep1&type, 12 pp.

Tommasi, F., et al., "Large-Scale Terrestrial Relaying of Satellite Broadcasted Real-Time Multimedia Streams,"International Journal of Computer Networks & Communications 3.3 (2011), http://citeseerx.ist.psu.edu/viewdoc/download?doi=10.1.1.206.913&rep=rep, 16 pp.

"TSACO-3000 Overview," DTV™ Innovations, dtvinnovations.com, accessed: Sep. 2015, http://www.dtvinnovations.com/tsaco-3000, 2 pp.

Taleb, T., et al., "On-Demand Media Streaming to Hybrid Wired/Wireless Networks Over Quasi-Geostationary Satellite Systems," Computer Networks 47.2 (2005), http://csc-studentweb.lr.edu/swp/Berg/PhD%20Background%20material%20-%20dissortation/Figures%20and%, 20 pp.

"Kt Selects Harmonic for Dual Satellite and Terrestrial Distribution of Primary and Backup Channels," Harmonic® harmonicinc.com, Dec. 7, 2009, http://harmonicinc.com/news/kt-selects-harmonic-dual-satellite-and-terrestrial-distribution-primary-and-backup-channels, 3 pp.

"Satellite Navigation Failure Confirms Urgent Need for Backup," Reuters, reuters.com, Apr. 7, 2014, http://www.reuters.com/article/2014/04/07/idUSnMKWbY4sba+1d0+MKW20140407, 3 pp.

Patton, C., "Hybrid Networks: Commerical Broadcaster's Play for Regionalized Programming," Via Satellite, satellitetoday.com, Mar. 26, 2014, http://www.satellitetoday.com/publications/2014/03/26/hybrid-networks-commerical-broadcasters-play-for-regionalized-programming/, 3 pp.

* cited by examiner

MEDIA CONTENT DISTRIBUTION

PRIORITY CLAIM

This application claims priority from, and is a divisional of, U.S. patent application Ser. No. 14/945,036, filed on Nov. 18, 2015, which is incorporated herein by reference in its entirety.

FIELD OF THE DISCLOSURE

The present disclosure is generally related to media content distribution.

BACKGROUND

Satellite television service providers communicate media content to subscribers using signals relayed via satellites. These satellite relayed signals can be disrupted by storms or other distribution issues. If a satellite relayed signal is disrupted, the subscribers may not be able to receive media content or the media content received may have degraded audio content or video content.

DETAILED DESCRIPTION

Figure 1:
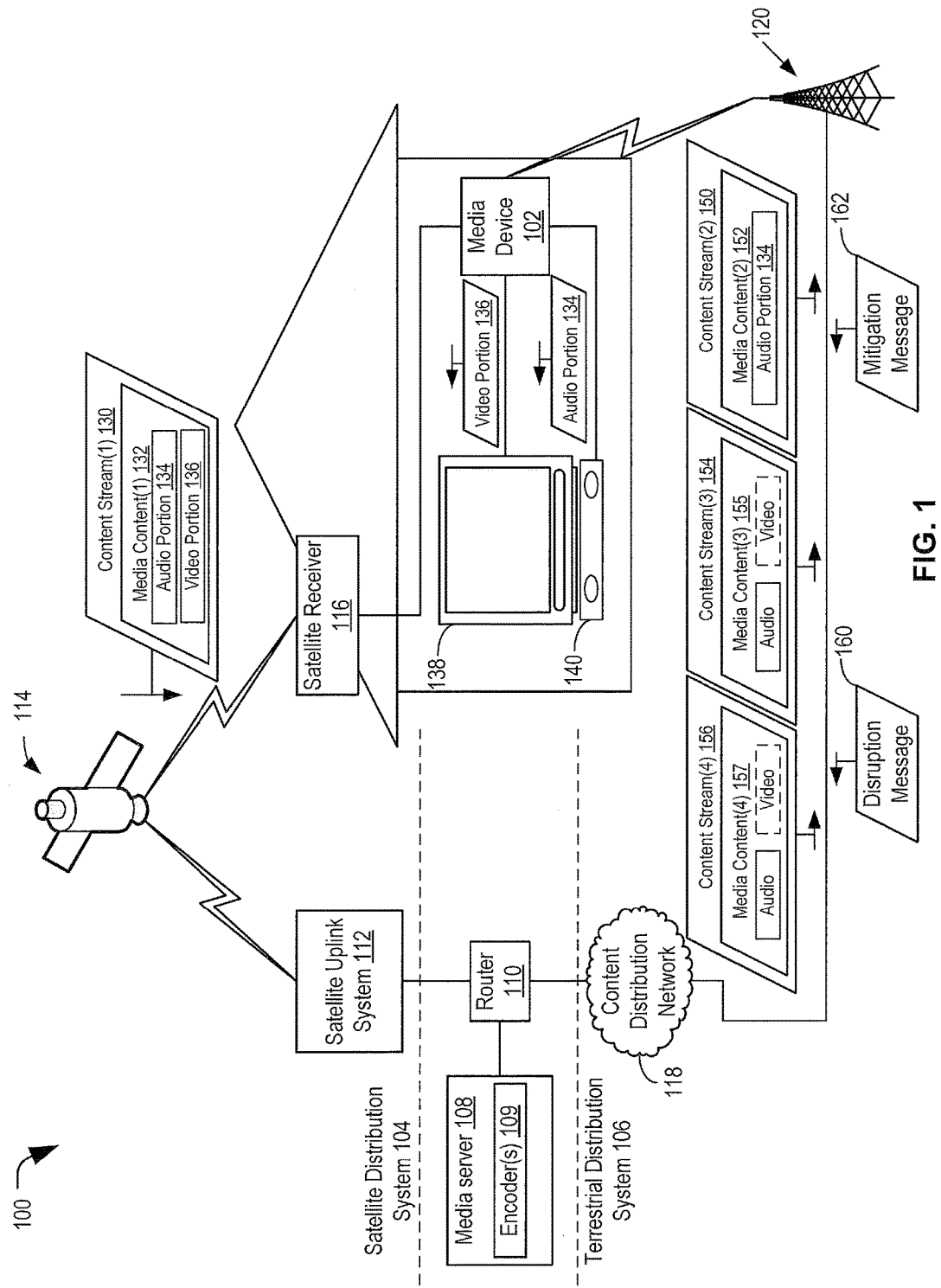
FIG. 1 is a block diagram of an embodiment of a system for media content distribution.

The present disclosure describes automated content recovery systems and methods for satellite-based video distribution. The automated content recovery system uses a terrestrial distribution system as a backup system for a satellite distribution system. The terrestrial distribution system may include wired connections, wireless connections, or combinations thereof. The terrestrial distribution system may act as a "hot" backup system in that while the satellite distribution system provides a media content stream to a subscriber, the terrestrial distribution system provides a subset of content of the media content stream. Thus, if a signal from the satellite distribution system is disrupted such that some of the content of the media content stream sent via the satellite distribution system is lost, a signal from the terrestrial distribution system can be used immediately or nearly immediately to replace at least a portion of the lost content. For example, the signal from the satellite distribution system may include high definition video content and associated audio content. In this example, the signal from the terrestrial distribution system may include only the audio content (or a reduced bit-rate version of the audio content). Thus, the signal from the terrestrial distribution system may have a significantly lower bit rate than the signal from the satellite distribution system. In this example, if a subscriber's media device loses the signal from the satellite distribution system, the media device can generate audio output using the signal from the terrestrial distribution system so that the subscriber is not left entirely without media content. Additionally, the media device can send a request (e.g., via the terrestrial distribution system) for the terrestrial distribution system to provide the video content of the media content stream. Further, the terrestrial stream can add video and increase video quality during the outage and then go back to using the satellite signal once the disruption has ceased.

In a particular embodiment, a media server (or a set of media servers) at a head-end of a provider receives a content stream to be distributed via a satellite distribution system. The media server processes the content stream to generate a first stream (e.g., a satellite stream) to be distributed via the satellite distribution system and a second stream (e.g., a terrestrial stream) to be distributed as a backup stream via the terrestrial distribution system. In a particular example, the terrestrial stream may be an audio-only stream encoded at a low bit rate. In other examples, the terrestrial stream (including audio and/or video) may be encoded using an adaptive bit rate (ABR) encoding technique such that multiple bit rate streams are generated.

The satellite stream and the terrestrial stream may be sent concurrently to subscribers. For example, a subscriber may cause a media device (e.g., a satellite receiver box) to receive a satellite channel associated with the satellite stream by sending a channel change request to the media device. In response to the channel change request, the media device may decode a portion of the satellite stream that includes the requested channel and may also send a request to the terrestrial distribution system for the terrestrial stream corresponding to the requested channel.

The media device may be configured to process (e.g., decode, decrypt, etc.) the satellite stream to generate an output media content stream. For example, the output media content stream may include audio content and video content, which may be sent to a display device for display. During normal viewing (e.g., when the satellite stream is not disrupted), the media device receives but may not use the terrestrial stream. For example, the media device may buffer content of the terrestrial stream so that the content is available for immediate use, but may not generate an output based on the terrestrial stream. If the media device detects disruption of the satellite stream (e.g., by a storm), the media device immediately or nearly immediately begins using the content of the terrestrial stream to generate output, which is provided to a device (e.g., a display device or an audio output device) for presentation to the subscriber. Thus, when the satellite signal, which may be a relatively high bit rate stream, is not available or is not reliable, the terrestrial signal, which may be a comparatively low bit rate stream, may provide a portion of the content for display or playback (e.g., audio may be provided to a speaker and/or visual information such as a signal disruption message may be provided to a display device).

Although the terrestrial stream may initially be a low bit rate stream (e.g., an audio-only stream), when the media device begins generating output based on the terrestrial stream, the media device may request a higher bit rate stream from the terrestrial distribution system. An encoder associated with the terrestrial distribution system may encode the higher bit rate stream and may send the higher bit rate stream to the media device in response to the request. In a particular example, the encoder may use adaptive bit rate (ABR) encoding techniques to gradually improve the quality (e.g., by increasing the bit rate) of media content sent to the media device. For example, in response to the request for a higher bit rate content stream, the encoder may send a first content stream that includes the audio content and a low bit rate version of the video content. Thus, the first content stream may have a higher bit rate than the audio-only terrestrial stream but a lower bit rate than the satellite stream. After sending some content using the first content stream, the encoder may begin encoding and sending a second content stream that includes the audio content and a higher bit rate version of the video content. Thus, the second content stream may have a higher bit rate than the first content stream but a lower bit rate than the satellite stream. Subsequently, the encoder may encode and send additional content streams that include the audio content and even higher bit rate versions of the video content. Eventually, the content stream sent via the terrestrial distribution system may have a bit rate that equals or exceeds the bit rate of the satellite stream or that satisfies a bit rate limit of the terrestrial distribution system. While the present disclosure describes an example of ABR encoding in the context of satellite receiver devices, the ABR encoding techniques could also be used for other devices, such as tablets and smartphones.

When the media device detects that the satellite signal is no longer disrupted, the media device may switch back to processing and displaying media content of the satellite stream. Additionally, the media device may notify the terrestrial distribution system, which may revert to sending the low bit rate terrestrial signal (e.g., the audio-only version of the media content).

In a particular embodiment, a method includes receiving, at a media device, a content stream via a satellite distribution system (e.g., a "first content stream"), the first content stream including first media content. While receiving the first content stream, the method includes receiving, at the media device, another content stream via a terrestrial distribution system (e.g., a "second content stream"). The second content stream includes second media content corresponding to an audio portion of the first media content. The method also includes sending the first media content to a display device and detecting a disruption of the first content stream. The method further includes, after detecting the disruption, sending the second media content to an audio output device associated with or included within the display device.

In another embodiment, a media device includes a first receiver, a second receiver, a processor, and a media interface. The first receiver is configured to receive a first content stream including first media content via a satellite distribution system. The second receiver is configured to receive a second content stream via a terrestrial distribution system while the first receiver is receiving the first content stream. The second content stream includes second media content corresponding to an audio portion of the first media content. The processor is configured to detect a disruption of the first content stream. The media interface is configured to send the first media content to a display device. The media interface is further configured to send the second media content to an audio output device associated with or included within the display device in response to the processor detecting the disruption of the first content stream.

In yet another embodiment, a method includes receiving media content at a media server. The method includes encoding the media content to form a first content stream and encoding an audio portion of the media content to form a second content stream. The method includes causing the first content stream to be transmitted from the media server to the media device via a satellite distribution system and causing the second content stream to be concurrently transmitted from the media server to the media device via a terrestrial distribution system. The method also includes receiving an indication of a disruption of the first content stream. After receiving the indication, the method further includes causing a third content stream to be transmitted from the media server to the media device via the terrestrial distribution system. The third content stream corresponds to a reduced bit rate version of the first content stream transmitted via the satellite distribution system.

Referring to FIG. 1, a particular embodiment of a system for media content distribution is illustrated and is generally designated 100. In FIG. 1, different content streams may be concurrently transmitted to a media device 102 via a satellite distribution system 104 and a terrestrial distribution system 106. As described further herein, in some cases, in the event that the media device 102 detects a disruption of a "primary" content stream transmission from the satellite distribution system 104, the media device 102 may switch to an alternate audio-only version of the disrupted content stream that is concurrently transmitted to the media device 102 via the terrestrial distribution system 106. As another example, the media device 102 may switch to a low bit rate video stream that is available/buffered at the media device 102, or the media device 102 may switch to an audio-only version of the disrupted content stream then add the low bit rate video stream to form a media stream that includes audio and video. Alternatively or additionally, in some cases, in the event that a media server 108 receives an indication of a disruption of the primary content stream, the media server 108 may cause another content stream (e.g., a reduced bit rate version of the disrupted content stream) to be transmitted to the media device 102 via the terrestrial distribution system 106. In either case, the availability of an alternative content stream transmitted to the media device 102 via the terrestrial distribution system 106 may improve a customer experience in the event of satellite signal disruption (e.g., in the event of a storm).

In the particular embodiment of FIG. 1, particular components of the satellite distribution system 104 and the terrestrial distribution system 106 are illustrated. It will be appreciated that alternative and/or additional components may be associated with the satellite distribution system 104 and/or the terrestrial distribution system 106. In FIG. 1, a router 110 (e.g., a head-end component) is illustrated as being communicatively coupled to a satellite uplink system 112 that is configured to communicate with a satellite 114 (or multiple satellites) of the satellite distribution system 104. FIG. 1 shows that the satellite 114 may be configured to send data to (and optionally receive data from) a satellite receiver 116 (e.g., a satellite dish) at a location associated with the media device 102. Additionally, the router 110 is communicatively coupled to a content distribution network 118 of the terrestrial distribution system 106. The content distribution network 118 may include wireline components, wireless components, or a combination thereof. To illustrate, FIG. 1 depicts an illustrative, non-limiting example where the terrestrial distribution system 106 includes a wireless access component 120 for communication with the media device 102. In other cases, content streams may be communicated to the media device 102 via a wireline element (or element) such as coaxial, fiber, twisted copper pair and/or a wireless element (or elements) of the terrestrial distribution system 106.

The media server 108 may be configured to receive media content from one or more media content sources (not shown in FIG. 1). The media server 108 may include an encoder 109 (or multiple encoders) that is configured to encode the media content to form a first content stream 130. The first content stream 130 may include first media content 132 that includes an audio portion 134 and a video portion 136. The encoder(s) 109 may also be configured to encode the audio portion 134 of the first media content 132 to form a second content stream 150. As described further herein, the encoder (s) 109 may also be configured to encode video, as the media device 102 may initially request the audio-only media stream, but the media device 102 may subsequently request video and audio after failover. In some cases, the first content stream 130 may have a first bit rate that is greater than a second bit rate of the second content stream 150. The second content stream 150 may include second media content 152 corresponding to the audio portion 134 of the first media content 132 (e.g., corresponding to the same audio or a compressed version of the audio). The media server 108 may be configured to cause the first content stream 130 to be transmitted to the media device 102 via the satellite distribution system 104 (e.g., via the router 110, the satellite uplink system 112, the satellite 114, and the satellite receiver 116). The media server 108 may be configured to cause the second content stream 150 to be concurrently transmitted to the media device 102 via the terrestrial distribution system 106 (e.g., via the content distribution network 118 that may include the wireless access component 120). While one media server 108 and one encoder 109 are illustrated in the example of FIG. 1, in other cases there may be more than one media server, more than one encoder, or a combination thereof. As an illustrative example, a stream may be split and provided to different media servers and/or encoders associated with the satellite distribution system 104 and the terrestrial distribution system 106.

The media device 102 may be configured to receive the first content stream 130 (including the first media content 132) via the satellite distribution system 104. The media device 102 may also be configured to concurrently receive the second content stream 150 via the terrestrial distribution system 106. As illustrated and further described herein with respect to FIG. 2, in some cases, the media device 102 may include multiple receivers configured to receive the content streams 130, 150. To illustrate, in some cases, the media device 102 may include a first receiver configured to receive data from the satellite receiver 116 and a second receiver (e.g., a wireline receiver or a wireless receiver) that is configured to receive data transmitted over the terrestrial distribution system 106. The media device 102 may be configured to receive the second content stream 150 via the terrestrial distribution system 106 while receiving the first content stream 130 via the satellite distribution system 104.

The media device 102 may be configured to send at least the video portion 136 of the first media content 132 to a display device 138. FIG. 1 illustrates a particular embodiment in which the media device 102 is configured to send the audio portion 134 of the first media content 132 to an audio output device 140 (e.g., a soundbar or a surround sound system) that is associated with the display device 138. In other cases, the audio output device 140 may be included within the display device 138, and the media device 102 may be configured to send the audio portion 134 of the first media content 132 and the video portion 136 of the first media content 132 to the display device 138. The media device 102 may be configured to discard or buffer the second content stream 150 (e.g., without processing or generating output based on the second content stream 150).

The media device 102 is configured to detect a disruption of the first content stream 130. For example, as further described herein with respect to FIG. 2, the disruption may be detected when a quantity of data that is buffered at a media buffer of the media device 102 fails to satisfy a playback disruption threshold (e.g., a threshold associated with an unacceptable customer experience). Alternatively or additionally, the disruption may be detected based on a quality level of the first content stream 130 (e.g., based on a signal-to-noise ratio, packet loss, etc.). After detecting the disruption, the media device 102 is configured to send the second media content 150 (received via the terrestrial distribution system 106) to the audio output device 140 associated with or included within the display device 138. The second media content 150 may correspond to the audio portion 134 of the first media content 132 (of the first content stream 130). As described further herein, subsequent media content may also include video content, and the media device 102 may continue to request terrestrial streams that may or may not include video content.

After detecting the disruption, the media device 102 may be configured to send a signal to a server associated with the terrestrial distribution system 106. In the example of FIG. 1, the signal is illustrated as a disruption indicator message 160 that may be transmitted to a server (e.g., the media server 108) via the content distribution network 118 of the terrestrial distribution system 106. Responsive to the signal, the encoder 109 may send a third content stream 154 to the media device 102. The third content stream 154 may include third media content 155 corresponding to the first media content 132. In some cases, the first content stream 130 may have a first bit rate that is greater than a third bit rate of the third content stream 154. In some embodiments, the terrestrial distribution system 106 may subsequently send a fourth content stream 156 to the media device 102 (corresponding to the first media content 132 sent via the satellite distribution system 104). The fourth content stream 156 may have a fourth bit rate that is greater than a third bit rate of the third content stream 154. While FIG. 1 illustrates an example of three terrestrial content streams, more than three content streams may be available in some cases (e.g., 10-12 different content streams) corresponding to different encoded versions of the same channel/stream. Thus, the media device 102 may receive the third content stream 154 in response to the disruption message 160 and may subsequently receive the fourth content stream 156. The media device 102 may generate and provide output corresponding to the third content stream 154 and the fourth content stream 156 to the display device 138 and the audio output device 140. To illustrate, in the event of an extended disruption of the satellite signal (e.g., due to a lengthy/heavy rain storm), switching to a higher quality version of a content stream (e.g., the fourth content stream 156) may provide an improved customer experience until the satellite signal disruption is mitigated (e.g., after the storm). Further, the number and quality of the terrestrial streams may be increased until the terrestrial bandwidth limit is reached.

In the particular embodiment illustrated in FIG. 1, the media device 102 may be configured to detect a mitigation of the disruption. As further described herein with respect to FIG. 2, in some cases, the media device 102 may determine that the disruption has been mitigated based on an amount of buffered data satisfying a playback disruption threshold (e.g., a threshold for a satisfactory customer experience, such as no visual pauses/disruption of video playback or limited visual pauses/disruption of video playback). The media device 102 may be configured to resume sending media content included in the first content stream 130 to the display device 138 after detecting the mitigation of the disruption. The media device 102 may also be configured to send a signal indicating the mitigation of the disruption to a server associated with the terrestrial distribution system 106. In the example of FIG. 1, the signal is illustrated as a mitigation message 162 that may be transmitted to a server (e.g., the media server 108) via the content distribution network 118 of the terrestrial distribution system 106.

In operation, the media device 102 may receive the first content stream 130 including the first media content 132 via the satellite distribution system 104. While receiving the first content stream 130, the media device 102 may receive the second content stream 150 including the second media content 152 corresponding to the audio portion 134 of the first media content 132. In some cases, the first content stream 130 has a first bit rate that is greater than a second bit rate of the second content stream 150. The media device 102 sends at least the video portion 136 of the first media content 132 to the display device 138 (and the audio portion 134 of the first media content 132 when the audio output device 140 is included within the display device 138). The media device 102 may detect a disruption of the first content stream 130. After detecting the disruption of the first content stream 130, the media device 102 sends the second media content 152 (received via the terrestrial distribution system 106) to the audio output device 140 associated with the display device 138 (or included within the display device 138).

Figure 2:
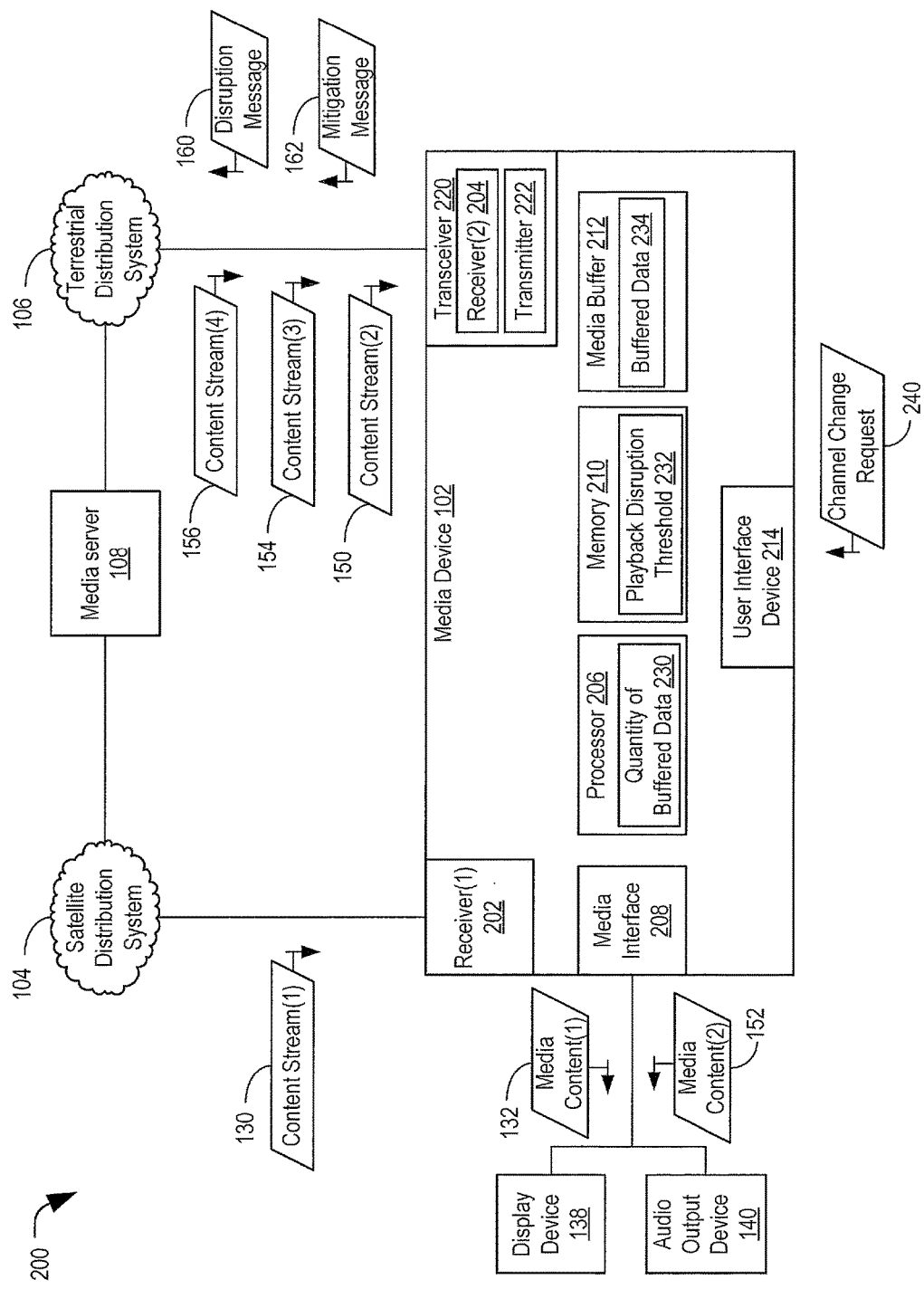
FIG. 2 is a block diagram of an embodiment of a system for media content distribution.

As described further herein with respect to FIG. 2, in some cases, the media device 102 may buffer data received via the first content stream 130 (e.g., at a media buffer). While sending the first media content 132 to the display device 138, the media device 102 may monitor a quantity of buffered data. The media device 102 may detect a disruption of the first content stream 130 when the quantity of buffered data fails to satisfy a playback disruption threshold (e.g., a threshold for a satisfactory customer experience). After detecting the disruption, the media device 102 may send the disruption message 160 to a server associated with the terrestrial distribution system 106. While FIG. 1 illustrates an example in which the disruption message 160 is sent to the media server 108, in other cases, the disruption message 160 may be sent to an alternative server associated with the terrestrial distribution system 106. FIG. 1 illustrates that, responsive to sending the disruption message 160, the media device 102 may receive (e.g., from the media server 108) the third content stream 154 that includes third media content 155 corresponding to the first media content 132. The first bit rate of the first content stream 130 may be greater than the third bit rate of the third content stream 154. After receiving the third content stream 154, the media device may receive (e.g., from the media server 108) the fourth content stream 156 via the terrestrial distribution system 106. The fourth content stream 156 may include fourth media content 157 corresponding to the first media content 132. The fourth content stream 156 may have a fourth bit rate that is greater than the third bit rate of the third content stream 154. As described further herein, the third content stream 154 and/or the fourth content stream 156 may also include video content.

The media device 102 may detect a mitigation of the disruption of the first content stream 130, and after detecting the mitigation, the media device 102 may resume decoding/ sending media content included in the first content stream 130 from the satellite distribution system 104 to the display device 138. FIG. 1 illustrates that the media device 102 may send the mitigation message 162 to the server associated with the terrestrial distribution system 106. The mitigation message 162 may correspond to a request for an audio-only stream (e.g., the second content stream 150 or another ABR stream). The media server 108 resumes sending the second content stream 150 to the media device 102 responsive to the request.

Thus, FIG. 1 illustrates an example of a system in which multiple content streams are transmitted to a media device via satellite/terrestrial distribution systems. In the event that the media device detects a disruption of a satellite signal, the media device may switch to an alternate audio-only version of the disrupted content stream that is concurrently transmitted via the terrestrial distribution system. Alternatively or additionally, in some cases, the media device may receive another content stream including audio and/or video (e.g., a reduced bit rate version of the disrupted content stream) via the terrestrial distribution system. In either case, the availability of an alternative content stream transmitted to the media device via the terrestrial distribution system may improve a customer experience by providing at least an audio-only version of a disrupted content stream in the event of satellite signal disruption (e.g., in the event of a storm).

Referring to FIG. 2, a particular embodiment of a system for media content distribution is illustrated and is generally designated 200. FIG. 2 illustrates a detailed view of particular components of the media device 102 of FIG. 1. In the example of FIG. 2, the media device 102 includes a first receiver 202 for receiving a primary content stream (e.g., a high bit rate version of media content) via the satellite distribution system 104 and a second receiver 204 for receiving an alternate content stream (e.g., a low bit rate version of the media content) via the terrestrial distribution system 106. As described further herein, the availability of an alternative content stream that is concurrently transmitted to the media device 102 via the terrestrial distribution system 106 may improve a customer experience by providing at least an audio-only version of a disrupted content stream in the event of satellite signal disruption (e.g., in the event of a storm).

In the particular embodiment illustrated in FIG. 2, the first receiver 202 is configured to receive the first content stream 130 (including the first media content 132, as shown in FIG. 1) via the satellite distribution system 104, and the second receiver 204 is configured to receive the second content stream 150 (including the second media content 152 corresponding to the first media content 132, as shown in FIG. 1) via the terrestrial distribution system 106. As described further herein, in some cases, the first content stream 130 and the second content stream 150 are sent to the media device 102 or processed by the media device 102 responsive to a channel change request 240. In some cases, the first content stream 130 may be encoded at a first bit rate, and the second content stream 150 may be encoded at a second bit rate that is less than the first bit rate.

In the example of FIG. 2, the media device 102 further includes a processor 206, a media interface 208, and a memory 210. The processor 206 may be configured to decode, decrypt, and/or otherwise process media streams into a format for output via the media interface 208 to the display device 138 and/or the audio output device 140. The processor 206 is configured to detect a disruption of the first content stream 130 and process the second content stream 150 in response to detecting the disruption. The processor 206 is configured to output the first content stream 130 and discard or buffer the second content stream 150 when the first content stream 130 is available. The media interface 208 is configured to send the first media content 132 (included in the first content stream 130, as shown in FIG. 1) to the display device 138. The media interface 208 is further configured to send the second media content 152 (included in the second content stream 150, as shown in FIG. 1) to the audio output device 140 in response to detecting the disruption of the first content stream 130. While FIG. 2 illustrates an example in which the audio output device 140 is a separate device from the display device 138, in other cases, the audio output device 140 may be included within the display device 138.

FIG. 2 illustrates that the media device 102 may include a transceiver 220 that includes the second receiver 204 and a transmitter 222. The transmitter 222 may be configured to send a signal (illustrated as the disruption message 160) to a server (e.g., the media server 108) associated with the terrestrial distribution system 106 in response to detecting the disruption of the first content stream 130. The second receiver 204 may be configured to receive the third content stream 154 via the terrestrial distribution system 106 after the disruption message 160 is sent. As described further herein with respect to FIG. 1, the third content stream 154 may include third media content 155 (e.g., audio and/or video) that corresponds to the first media content 132 (included in the first content stream 130, as shown in FIG. 1). As an example, the first content stream 130 may have a first bit rate that is greater than a third bit rate of the third content stream 154. FIG. 2 further illustrates that the second receiver 204 may be configured to receive the fourth content stream 156 after receiving the third content stream 154. As described further herein with respect to FIG. 1, the fourth content stream 156 may include fourth media content 157 (e.g., audio and/or video) that corresponds to the first media content 132 (included in the first content stream 130, as shown in FIG. 1). The fourth content stream 156 may have a fourth bit rate that is greater than the third bit rate (of the third content stream 154). To illustrate, in the event of an extended disruption of the satellite signal (e.g., due to a lengthy/heavy rain storm), switching to a higher quality version of a content stream (e.g., the fourth content stream 156) may provide an improved customer experience until the satellite signal disruption is mitigated (e.g., after the storm).

The processor 206 may be configured to detect a mitigation of the disruption and to cause the media interface 208 to resume sending the first media content 132 (included in the first content stream 130, as shown in FIG. 1) to the display device 138 based on detecting the mitigation of the disruption. FIG. 2 illustrates that the transmitter 222 may be further configured to send a second signal (e.g., the mitigation message 162) to the server associated with the terrestrial distribution network 106 responsive to the processor 206 detecting the mitigation of the disruption.

In a particular embodiment, the media buffer 212 is configured to buffer data received via the first content stream 130. The processor 206 may be configured to monitor a quantity of data 230 that is buffered at the media buffer 212 while the first media content 132 (included in the first content stream 130, as shown in FIG. 1) is being sent to the display device 138. To illustrate, a playback disruption threshold 232 (e.g., associated with a satisfactory customer experience) may be stored at the memory 210, and the processor 206 may be configured to detect the disruption when the quantity of data 230 corresponding to buffered data 234 stored at the media buffer 212 fails to satisfy the playback disruption threshold 232. Similarly, the processor 206 may be configured to detect the mitigation of the disruption when the quantity of data 230 corresponding to the buffered data 234 stored at the media buffer 212 satisfies the playback disruption threshold 232. Additionally, there may be different thresholds for disruption and mitigation. Alternatively, the media device 102 may detect a disruption based on other metrics such as a signal-to-noise ratio or packet loss, among other alternatives.

Thus, FIG. 2 illustrates a system 200 of media content distribution in which multiple content streams are transmitted to a media device via satellite/terrestrial distribution systems. In the event that the media device detects a disruption of a satellite signal, the media device may switch to an alternate audio-only version of the disrupted content stream that is concurrently transmitted via the terrestrial distribution system. Alternatively or additionally, in some cases, the media device may receive another content stream (e.g., a reduced bit rate version of the disrupted content stream) via the terrestrial distribution system. In either case, the availability of an alternative content stream transmitted to the media device via the terrestrial distribution system may improve a customer experience by providing at least an audio-only version of a disrupted content stream in the event of satellite signal disruption (e.g., in the event of a storm).

Figure 3:
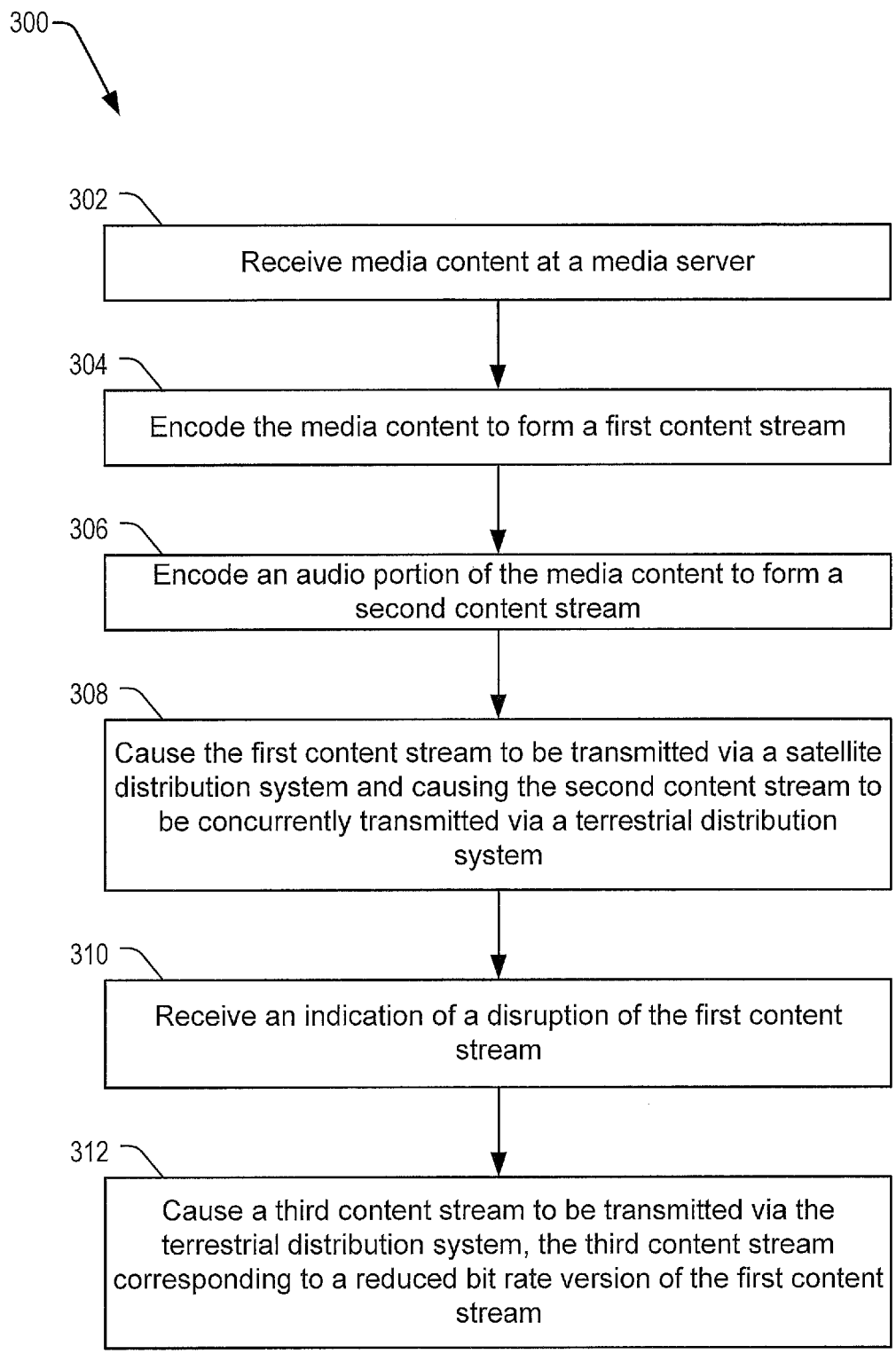
FIG. 3 is a flowchart of an illustrative embodiment of a method of media content distribution.

Referring to FIG. 3, a particular embodiment of a method of media content distribution is illustrated and is generally designated 300. The method 300 may be performed by a media server, such as the media server 108 of FIG. 1 and FIG. 2. FIG. 3 illustrates that a media server may cause content streams to be concurrently transmitted to a media device via a satellite distribution system and a terrestrial distribution system. In the event that the media server receives an indication of a disruption of a content stream that is transmitted via the satellite distribution system, the media server may cause another content stream (e.g., a reduced bit rate version of the disrupted content stream) to be transmitted to the media device via the terrestrial distribution system. While the alternate content stream having the reduced bit rate may be a lower quality stream, the ability to transmit the alternate stream in the event of disruption of the higher quality stream may improve a customer experience by providing at least an audio-only version of a disrupted content stream in the event of satellite signal disruption (e.g., in the event of a storm).

The method 300 includes receiving media content at a media server, at 302. For example, the media server 108 of FIG. 1 and FIG. 2 may receive media content from one or more media content sources (not shown). The method 300 includes encoding the media content to form a first content stream, at 304. For example, the media server 108 of FIG. 1 and FIG. 2 may encode the first media content 132 to form the first content stream 130 for transmission to the media device 102 via the satellite distribution system 104. The method 300 includes encoding an audio portion of the media content to form a second content stream, at 306. For example, the media server 108 of FIG. 1 and FIG. 2 may encode the audio portion 134 of the first media content 132 to form the second content stream 150 for transmission to the media device 102 via the terrestrial distribution system 106.

The method 300 includes causing the first content stream and the second content stream to be transmitted from the media server to a media device, at 308. The first content stream is transmitted via a satellite distribution system, and the second content stream is transmitted concurrently via a terrestrial distribution system. For example, referring to FIG. 1, the satellite 114 may transmit or relay the first content stream 130 (including the audio portion 134 and the video portion 136) received from the media server 108 via the satellite uplink system 112 to the media device 102. The media server 108 may cause the second content stream 150

(including the audio portion 134) to be concurrently transmitted to the media device 102 via the content distribution network 118 (that may include the wireless component 120). As another example, referring to FIG. 2, the media server 108 may cause the first content stream 130 to be transmitted to the first receiver 202 of the media device 102, and the media server 108 may cause the second content stream 150 to be transmitted to the second receiver 204 of the media device 102.

The method 300 includes receiving an indication of a disruption of the first content stream, at 310. For example, referring to FIG. 1, the media server 108 may receive the disruption message 160 from the media device 102 via the content distribution network 118 of the terrestrial distribution system 106. As another example, referring to FIG. 2, the media server 108 may receive the disruption message 160 that is transmitted by the transmitter 222 of the media device 102 via the terrestrial distribution system 106. The disruption message 160 may represent a request for another ABR stream from the media server 108. In some cases, the media server 108 may encode the media content associated with the disrupted content stream to form another content stream, and the media server 108 may send the other content stream in response to receiving the indication of the disruption.

After receiving the indication of the disruption, at 310, the method 300 includes causing a third content stream to be transmitted from the media server to the media device via the terrestrial distribution system, at 312. The third content stream corresponds to a reduced bit rate version of the first content stream transmitted via the satellite distribution system. For example, referring to FIG. 1 and FIG. 2, after receiving the disruption message 160, the media server 108 may cause the third content stream 154 to be transmitted to the media device 102 via the terrestrial distribution system 106. As described further herein with respect to FIG. 1 and FIG. 2, the third content stream 154 may correspond to a reduced bit rate version of the first content stream 130 that is transmitted via the satellite distribution system 104. Although not illustrated in FIG. 3, the media server 108 may send additional streams at different bit rates and may stop sending the reduced bit rate version(s) in response to mitigation of the disruption.

Thus, FIG. 3 illustrates an example of a method of media content distribution that includes concurrent transmission of content streams from a media server to a media device via a satellite distribution system and a terrestrial distribution system. In the event of a disruption of a content stream transmitted to the media device via the satellite distribution system, a reduced bit rate version of the disrupted content stream may be transmitted to the media device via the terrestrial distribution system. Thus, the different content distribution systems may improve a customer experience by providing at least an audio-only version of a disrupted content stream in the event of a satellite signal transmission disruption (e.g., in the event of a storm).

Figure 4:
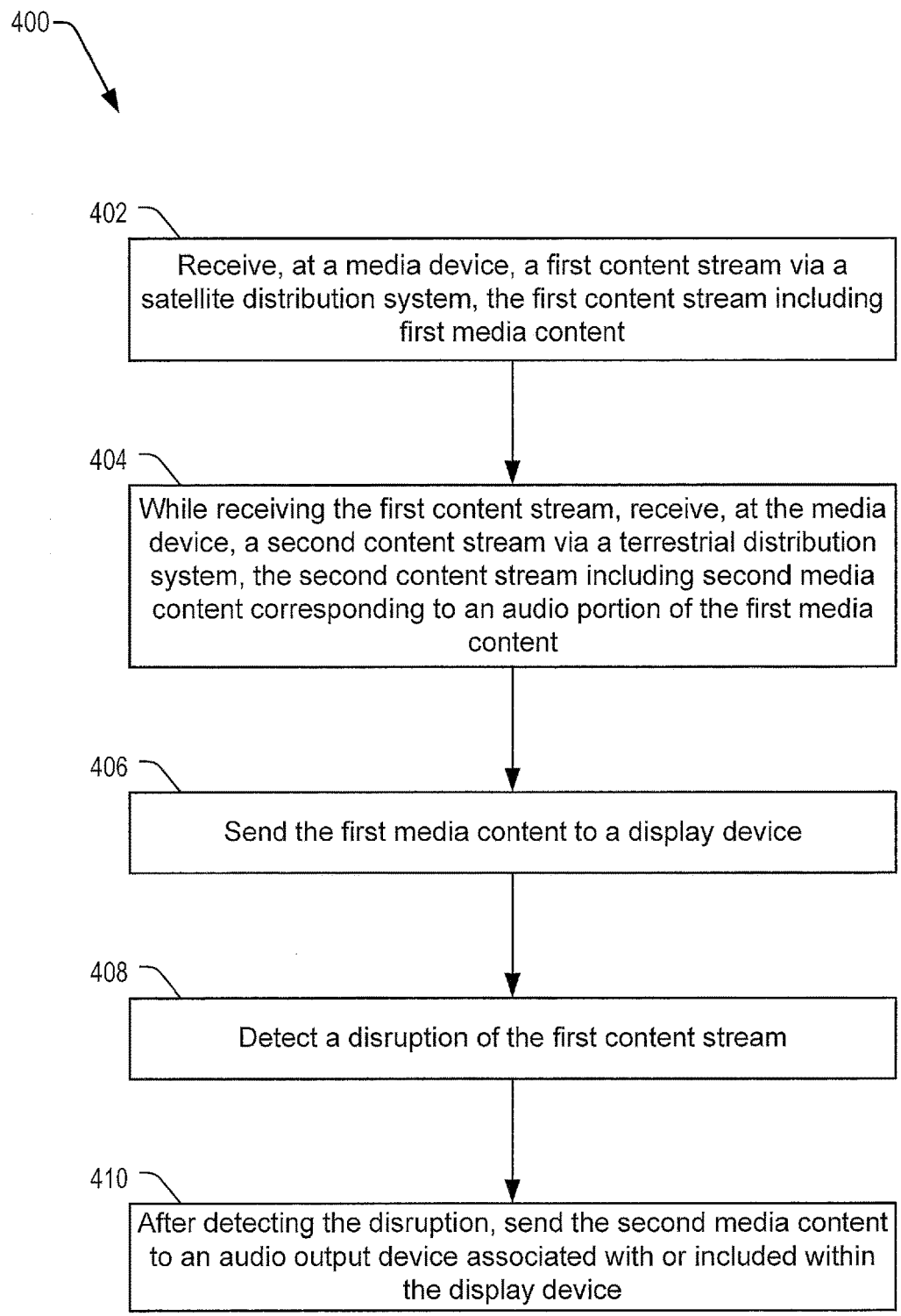
FIG. 4 is a flowchart of an illustrative embodiment of a method of media content distribution.

Referring to FIG. 4, a particular embodiment of a method of media content distribution is illustrated and is generally designated 400. The method 400 may be performed by the media device 102 of FIG. 1 and FIG. 2. In FIG. 4, a media device may receive different versions of a content stream via different distribution systems (e.g., a satellite distribution system and a terrestrial distribution system). In the event that the media device detects a disruption of a content stream transmission from the satellite distribution system, the media device may switch to an alternate audio-only version of the disrupted content stream that is transmitted to the media device via the terrestrial distribution system. Thus, the availability of different content streams from different content distribution systems may improve a customer experience by providing at least an audio-only version of a disrupted content stream in the event of a satellite signal transmission disruption (e.g., in the event of a storm).

The method 400 includes receiving, at a media device, a first content stream, at 402. The first content stream includes first media content and is received via a satellite distribution system. For example, the media device 102 of FIG. 1 and FIG. 2 may receive the first content stream 130 that includes the first media content 132 via the satellite distribution system 104.

The method 400 includes receiving a second content stream at the media device while receiving the first content stream, at 404. The second content stream includes second media content corresponding to an audio portion of the first media content and is received via a terrestrial distribution system. For example, referring to FIG. 1 and FIG. 2, the media device 102 may receive the second content stream 150 via the terrestrial distribution system 106 while receiving the first content stream 130 via the satellite distribution system 104. FIG. 1 illustrates that the second content stream 150 includes the second media content 152 corresponding to the audio portion 134 of the first media content 132.

The method 400 includes sending the first media content to a display device, at 406. For example, referring to FIG. 1 and FIG. 2, the media device 102 may send the video portion 136 of the first media content 132 to the display device 138. While FIG. 1 and FIG. 2 illustrate an example in which the media device 102 sends the audio portion 134 of the first media content 130 to the audio output device 140 that is separate from the display device 138 (e.g., a soundbar), in other cases, the media device 102 may send the audio portion 134 to an audio output device that is included within the display device 138 (e.g., a speaker within a housing of a television).

The method 400 includes detecting a disruption of the first content stream, at 408. For example, referring to FIG. 1 and FIG. 2, the media device 102 may detect a disruption of the first content stream 130. As described further herein with respect to FIG. 2, in some cases, the disruption may be detected based on an amount of the buffered data 234 at the media buffer 212 failing to satisfy the playback disruption threshold 232. In the examples illustrated in FIG. 1 and FIG. 2, the media device 102 may generate the disruption message 160 in response to detecting the disruption of the first content stream 130.

After detecting the disruption, at 408, the method 400 includes sending the second media content to an audio output device associated with or included within the display device, at 410. For example, referring to FIG. 1 and FIG. 2, the media device 102 may send the second media content 152 corresponding to the audio portion 134 of the first media content 132 to the audio output device 140. As described herein, while FIG. 1 and FIG. 2 illustrate an example in which the audio output device 140 is a separate device from the display device 138, in other cases, an audio output device may be included within the display device 138. Although not illustrated in FIG. 4, the method 400 could also include sending different content from other content streams (e.g., the third content stream 154 and the fourth content stream 156) to the display device 138 and/or the audio output device 140.

Thus, FIG. 4 illustrates an example of a method of sending different media content to a display device (or an audio output device included within the display device) that is received at a media device via different content distribution systems. In the event that the media device detects a disruption of a content stream transmission from a satellite distribution system, the media device may switch to an alternate, audio-only version of the disrupted content stream transmitted to the media device via the terrestrial distribution system. Thus, FIG. 4 illustrates that the availability of different content streams from different content distribution systems may improve a customer experience by providing at least an audio-only version of a disrupted content stream in the event of a satellite signal transmission disruption (e.g., in the event of a storm).

Figure 5:
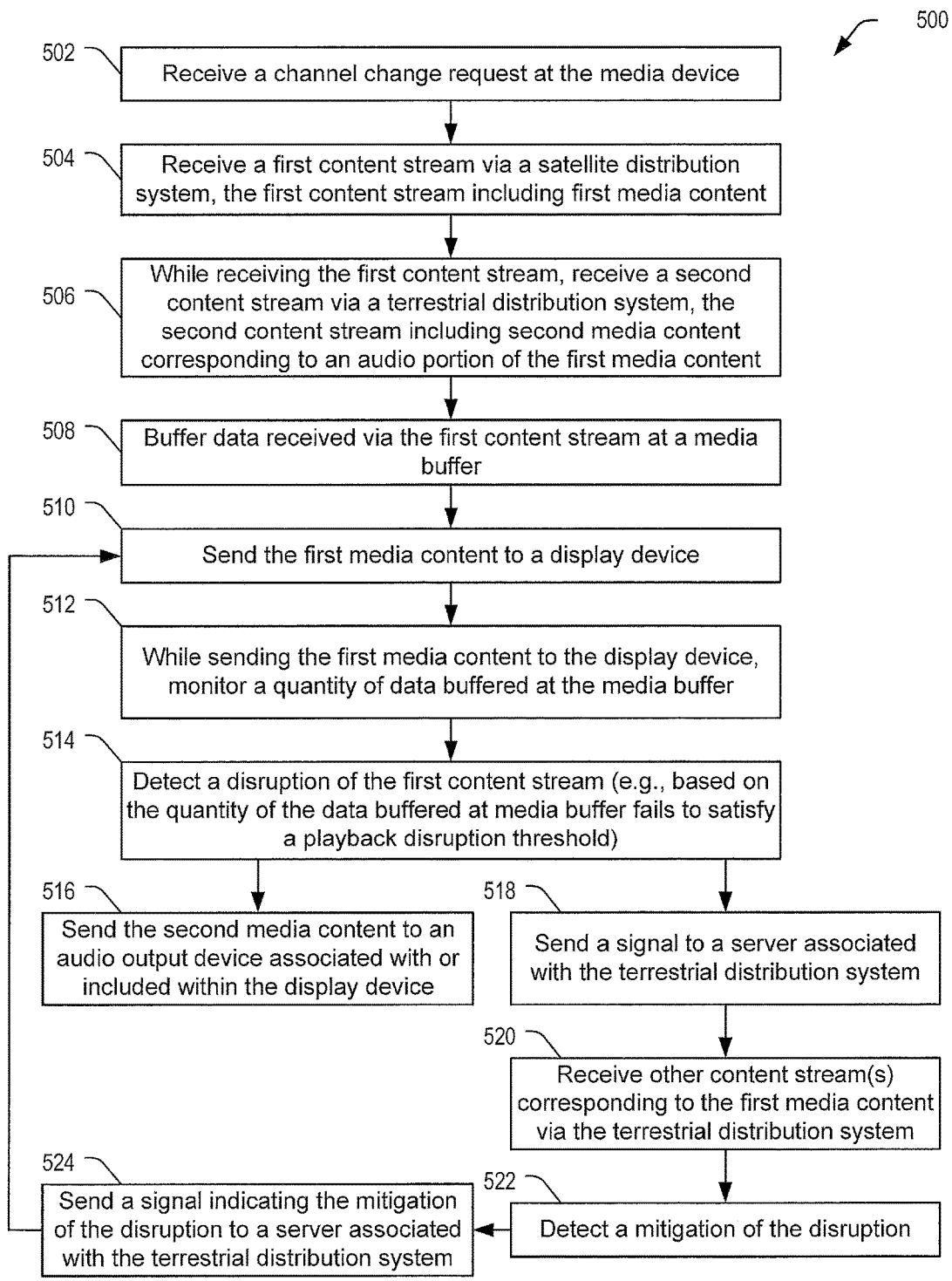
FIG. 5 is a flowchart of an illustrative embodiment of a method of media content distribution.

Referring to FIG. 5, a particular embodiment of a method of media content distribution is illustrated and is generally designated 500. The method 500 may be performed by the media device 102 of FIG. 1 and FIG. 2. In FIG. 5, a media device may receive different versions of a content stream via different distribution systems (e.g., a satellite distribution system and a terrestrial distribution system). In the event that the media device detects a disruption of a content stream transmission from the satellite distribution system, the media device may switch to an alternate audio-only version of the disrupted content stream that is transmitted to the media device via the terrestrial distribution system. Thus, the availability of different content streams from different content distribution systems may improve a customer experience by providing at least an audio-only version of a disrupted content stream in the event of a satellite signal transmission disruption (e.g., in the event of a storm).

In the particular embodiment illustrated in FIG. 5, the method 500 includes receiving a channel change request at the media device, at 502. For example, referring to FIG. 2, the media device 102 may receive the channel change request 240 via the user interface device 214. Additionally, in response to the channel change request 240, the media device 102 may decode a portion of a satellite signal for a requested channel and may send a request for content associated with the requested channel to the terrestrial distribution system 106.

The method 500 includes receiving a first content stream via a satellite distribution system, at 504. The first content stream includes first media content. For example, referring to FIG. 2, the media device 102 may receive the first content stream 130 (including the first media content 132) via the satellite distribution system 104. The media device 102 may discard or buffer (but not process) the second content stream 150 while the first content stream 130 is being used.

The method 500 includes receiving a second content stream while receiving the first content stream, at 506. The second content stream includes second media content corresponding to an audio portion of the first media content and is received via a terrestrial distribution system. For example, referring to FIG. 2, the media device 102 may receive the second content stream 150 (including the second media content 152) via the terrestrial distribution system 106 while receiving the first content stream 130 via the satellite distribution system 104.

The method 500 includes buffering data received via the first content stream at a media buffer, at 508. For example, referring to FIG. 2, the media device 102 may buffer data received via the first content stream 130 at the media buffer 212 (shown as the buffered data 234).

The method 500 includes sending the first media content to a display device, at 510. For example, referring to FIG. 2, the media device 102 may send the first media content 132 to the display device 138 via the media interface 208 (e.g., using a high-definition multimedia interface (HDMI) cable or other media output cable).

The method 500 includes monitoring a quantity of data buffered at the media buffer while sending the first media content to the display device, at 512. For example, referring to FIG. 2, the media device 102 may monitoring the quantity of data buffered at the media buffer 212 (shown as the buffered data 234 in FIG. 2) while sending the first media content 132 to the display device 138.

The method 500 includes detecting a disruption of the first content stream, at 514. In a particular embodiment, the disruption may be detected based on the quantity of data that is buffered at a media buffer of the media device failing to satisfy a playback disruption threshold. For example, referring to FIG. 2, the media device 102 may detect a disruption of the first content stream 130 based on the buffered data 234 at the media buffer 212 failing to satisfy the playback disruption threshold 232 stored at the memory 210.

The method 500 includes, in response to detecting the disruption, sending the second media content to an audio output device associated with the display device, at 516. For example, referring to FIG. 2, the media device 102 may send the second media content 152 to the audio output device 140 associated with the display device 138 via the media interface 208. As described herein, FIG. 2 illustrates an example in which the audio output device 140 is a separate device from the display device 138. In other cases, an audio output device may be included within the display device 138.

The method 500 also includes, in response to detecting the disruption, sending a signal to a server associated with the terrestrial distribution system, at 518. For example, referring to FIG. 2, the media device 102 may send the disruption message 160 to the media server 108 associated with the terrestrial distribution system 106.

The method 500 includes receiving one or more other content streams corresponding to the first media content via the terrestrial distribution system, at 520. For example, referring to FIG. 2, the media device 102 may receive the third content stream 154 (including audio and/or video corresponding to the first media content 132). As another example, referring to FIG. 2, the media device 102 may receive the fourth content stream 156 (including audio and/or video corresponding to the first media content 132).

The method 500 includes detecting a mitigation of the disruption, at 522. For example, referring to FIG. 2, the media device 102 may detect a mitigation of the disruption based on the buffered data 234 stored at the media buffer 212 satisfying the playback disruption threshold 232.

The method 500 includes, in response to detecting the mitigation, sending a signal indicating the mitigation of the disruption to a server associated with the terrestrial distribution system, at 524. For example, referring to FIG. 2, the media device 102 may send the mitigation message 162 to the media server 108 associated with the terrestrial distribution system 106. In the example of FIG. 2, the media device 102 includes the transceiver 220 that includes the transmitter 222, and the transmitter 222 may be used to send the mitigation message 162 to the media server 108.

After sending the signal indicating the mitigation of the disruption, at 524, FIG. 5 illustrates that the method 500 may return to 510, where the first media content may be sent to the display device. For example, referring to FIG. 2, after sending the mitigation message 162, the media device 102 may resume sending the first media content 132 to the display device 138. The media device 102 may resume receiving, discarding, and/or buffering content streams received from the terrestrial distribution system 106.

Thus, FIG. 5 illustrates an example of a method of sending different media content to a display device (or an audio output device included within the display device) that is received at a media device via different content distribution systems. In the event that the media device detects a disruption of a content stream transmission from a satellite distribution system (e.g., based on a quantity of buffered data failing to satisfy a playback threshold), the media device may switch to an alternate, audio-only version of the disrupted content stream transmitted to the media device via the terrestrial distribution system. Thus, FIG. 5 illustrates that the availability of different content streams from different content distribution systems may improve a customer experience by providing at least an audio-only version of a disrupted content stream in the event of a satellite signal transmission disruption (e.g., in the event of a storm).

Figure 6:
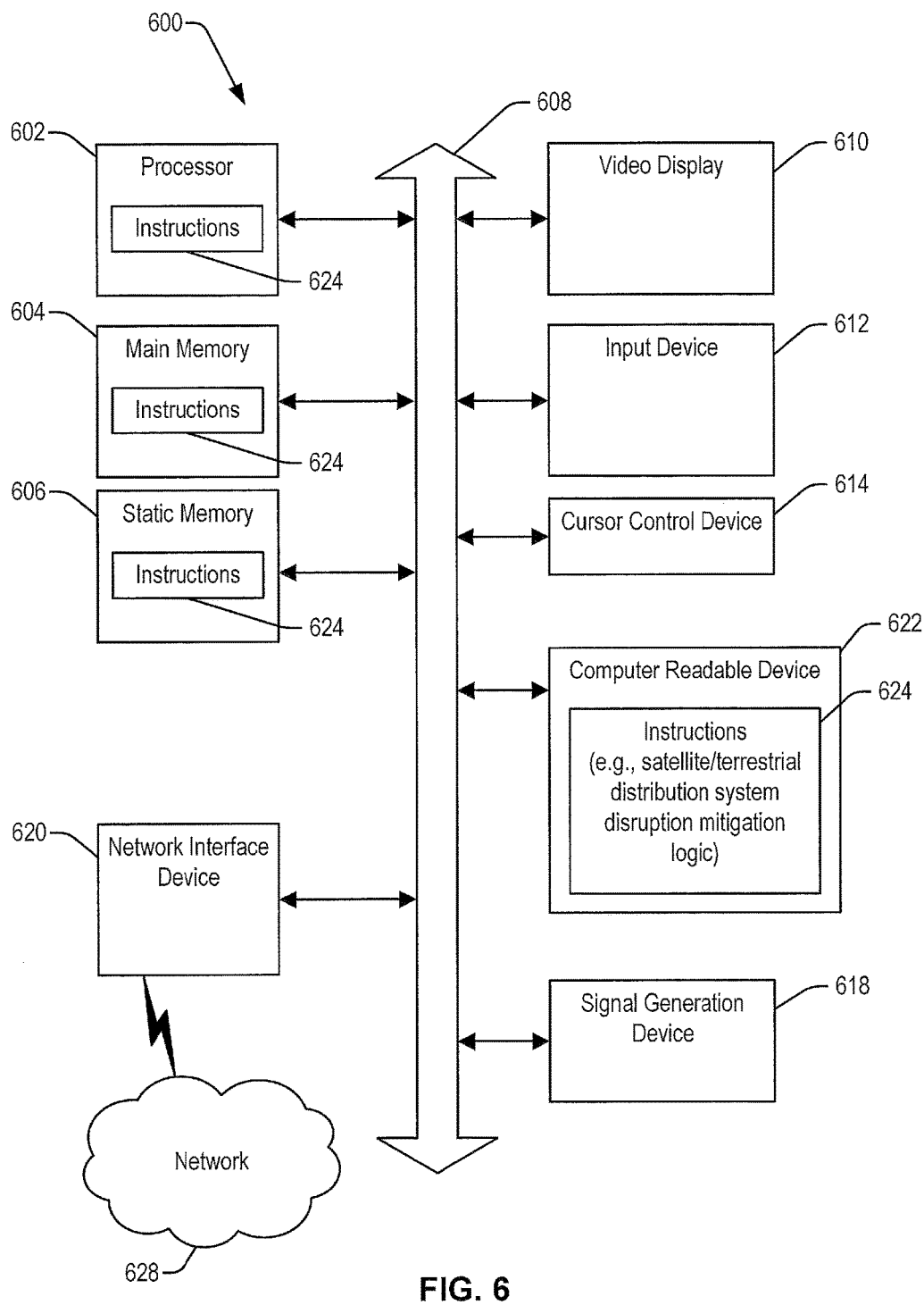
FIG. 6 is a block diagram of an illustrative embodiment of a general computer system.

Referring to FIG. 6, an illustrative embodiment of a general computer system is shown and is designated 600. The computer system 600 includes a set of instructions that can be executed to cause the computer system 600 to perform any one or more of the methods or computer based functions disclosed herein. The computer system 600 may operate as a standalone device or may be connected, e.g., using a network, to other computer systems or peripheral devices. For example, the computer system 600 may include or be included within any one or more of the media device 102 of FIG. 1 and FIG. 2 or the media server 108 of FIG. 1.

In a networked deployment, the computer system 600 may operate in the capacity of a server or as a client user computer in a server-client user network environment, or as a peer computer system in a peer-to-peer (or distributed) network environment. The computer system 600 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 600 may be implemented using electronic devices that provide video, audio, or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. For example, the processor 602 may include or correspond to the processor 206 of the media device 102 of FIG. 1 and FIG. 2 (with the processor 206 shown in the detailed view of the media device 102 illustrated in FIG. 2) or a processor of the media server 108 of FIG. 1 and FIG. 2. Moreover, the computer system 600 may include a main memory 604 and a static memory 606, which can communicate with each other via a bus 608. For example, the main memory 604 may include or correspond to the memory 210 of the media device 102 of FIG. 1 and FIG. 2 (with the memory 210 shown in the detailed view of the media device 102 illustrated in FIG. 2) or a memory of the media server 108 of FIG. 1 and FIG. 2.

As shown, the computer system 600 may further include a video display unit 610, such as a liquid crystal display (LCD), a light emitting diode (LED) display, a touch screen display, a flat panel display, or a solid state display. For example, the video display unit 610 may correspond to the display device 138 of FIG. 1 and FIG. 2. Additionally, the computer system 600 may include an input device 612, such as a remote control device or a keyboard, and a cursor control device 614, such as a mouse. For example, the input device 612 may correspond to a remote control device that sends a signal (e.g., the channel change request 240) to the media device 102 via the user interface device 214 of FIG. 2. As another example, the user interface device 214 may correspond to another input device (e.g., one or more channel change buttons) that may be included within the media device 102. In some embodiments, the input device 612 and the cursor control device 614 may be integrated into a single device, such as a capacitive touch screen input device. The computer system 600 may also include a signal generation device 618, such as a speaker, and a network interface device 620. For example, the signal generation device 618 may correspond to an audio output device that is associated with or included within the video display unit 610. To illustrate, the signal generation device 618 may correspond to a speaker included within the display device 138 of FIG. 1 and FIG. 2 or a speaker associated with the display device (e.g., the audio output device 140 illustrated as a separate device in FIG. 1 and FIG. 2). Some computer systems 600 may not include an input device (e.g., a server may not include an input device).

In a particular embodiment, as depicted in FIG. 6, the device 600 may include computer-readable storage 622 in which one or more sets of instructions 624, e.g. software, can be embedded. The computer-readable storage 622 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 624 may embody one or more of the methods or logic as described herein. The instructions 624 may be executable by the processor 602 to perform one or more functions or methods described herein (illustrated as "satellite/terrestrial distribution system disruption mitigation logic in FIG. 6), such as one or more of the methods 300, 400, 500 described with reference to FIGS. 3-5. In a particular embodiment, the instructions 624 may reside completely, or at least partially, within the main memory 604, the static memory 606, and/or within the processor 602 during execution by the computer system 600. The main memory 604 and the processor 602 also may include a computer-readable storage device.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 622 that stores instructions 624, so that a device connected to a network 628 may communicate voice, video or data over the network 628. While the computer-readable storage 622 is shown to be a single device, the computer-readable storage 622 may include a single device or multiple devices, such as a centralized or distributed database, and/or associated caches and servers that store one or more sets of instructions. The computer-readable storage 622 is capable of storing a set of instructions for execution by a processor to cause a computer system to perform any one or more of the methods or operations disclosed herein. For example, the computer-readable storage device 622 may store instructions for execution by a processor to cause a computer system to perform one or more of the methods 300, 400, 500 described with reference to FIGS. 3-5.

In a particular non-limiting, exemplary embodiment, the computer-readable storage 622 may include a solid-state memory such as embedded memory (or a memory card or other package that houses one or more non-volatile read-only memories). Further, the computer-readable storage 622 may be a random access memory or other volatile re-writable memory. Additionally, the computer-readable storage 622 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 600 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
receiving media content at a media server;
encoding the media content to form a first content stream;

encoding an audio portion of the media content to form a second content stream having a first bit rate;

causing the first content stream to be transmitted from the media server to a media device via a satellite distribution system and causing the second content stream to be concurrently transmitted from the media server to the media device via a terrestrial distribution system;

receiving, at the media server from the media device, a first indication of a disruption of the first content stream;

after receiving the first indication and prior to receipt of an end of disruption indication, causing a third content stream to be transmitted from the media server to the media device via the terrestrial distribution system, the third content stream having a second bit rate greater than the first bit rate;

without receipt of an end of disruption indication, causing a fourth content stream to be transmitted from the media server to the media device via the terrestrial distribution system, the fourth content stream having a third bit rate greater than the second bit rate;

receiving the end of disruption indication; and sending the second content stream to the media device via the terrestrial distribution system responsive to the end of disruption indication.

2. The method of claim 1, further comprising encoding the media content to form the third content stream, the third content stream comprising the audio portion and a video portion of the media content.

3. The method of claim 1, wherein the third content stream is sent based on a request from the media device for a higher bit rate stream.

4. The method of claim 1, wherein the end of disruption indication is received via the terrestrial distribution system.

5. The method of claim 1, wherein the third bit rate of the fourth content stream corresponds to a particular bit rate of the first content stream, a bit rate limit of the terrestrial distribution system, or both.

6. The method of claim 1, further comprising receiving, via the terrestrial distribution system a request for the media content.

7. The method of claim 1, wherein the second content stream corresponds to a first adaptive bit rate stream of the media content.

8. The method of claim 7, wherein the third content stream corresponds to a second adaptive bit rate stream of the media content.

9. The method of claim 1, wherein the second content stream comprises a compressed version of audio of the first content stream.

10. The method of claim 1, wherein the first indication is received via the terrestrial distribution system.

11. A media server comprising:

a processor; and a memory coupled to the processor, the memory including instructions executable by the processor to perform operations including:

receiving a request for media content from a media device, the media content corresponding to a first content stream sent via a satellite distribution system to the media device;

causing transmission of an audio content stream to the media device via a terrestrial distribution system responsive to the request, the audio content stream comprising audio content of the media content, wherein the audio content stream enables the media device to change from the first content stream to the audio content stream responsive to disruption of the first content stream at the media device;

receiving a first indication, the first indication corresponding to a disruption of the first content stream at the media device;

after receiving the first indication and prior to receipt of an end of disruption indication, causing a change from transmission of the audio content stream via the terrestrial distribution system to transmission of a second content stream of the media content to the media device via the terrestrial distribution system, the second content stream including video content and audio content of the media content, wherein the second content stream corresponds to a first bit rate;

without receipt of the end of disruption indication, changing from transmission by the terrestrial distribution system of the second content stream to transmission by the terrestrial distribution system of a third content stream with a second bit rate that is greater than the first bit rate;

receiving the end of disruption indication; and causing a return to transmission of the audio content stream to the media device via the terrestrial distribution system responsive to the end of disruption indication.

12. The media server of claim 11, further comprising an interface to the satellite distribution system.

13. The media server of claim 11, further comprising an interface to the terrestrial distribution system.

14. The media server of claim 11, wherein the second content stream is transmitted based on a request from the media device for a higher bit rate stream.

15. The media server of claim 11, wherein the second bit rate of the third content stream corresponds to a particular bit rate of the first content stream, a bit rate limit of the terrestrial distribution system, or both.

16. A computer-readable storage device storing instructions that, when executed by a processor, cause the processor to perform operations comprising:

receiving a request for media content from a media device, the media content corresponding to a first content stream sent via a satellite distribution system to the media device;

causing transmission of an audio content stream to the media device via a terrestrial distribution system responsive to the request, the audio content stream comprising audio content of the media content, wherein the audio content stream enables the media device to change from the first content stream to the audio content stream responsive to disruption of the first content stream at the media device;

receiving a first indication of a disruption of the first content stream at the media device;

after receiving the first indication, causing a change from transmission of the audio content stream via the terrestrial distribution system to transmission of a second content stream of the media content to the media device via the terrestrial distribution system, the second content stream including video content and audio content of the media content, wherein the audio content stream and the second content stream comprise adaptive bit rate streams, and wherein a bit rate associated with the audio content stream is lower than a particular bit rate associated with the second content stream;

receiving a second indication, the second indication indicative of an end to the disruption of the first content stream at the media device; and causing a return to transmission of the audio content stream to the media device via the terrestrial distribution system responsive to the second indication.

17. The computer-readable storage device of claim 16, wherein the operations further comprise, before receiving the second indication, transmitting a third content stream of the media content to the media device via the terrestrial distribution system, wherein the particular bit rate associated with the second content stream is lower than a first particular bit rate associated with the third content stream.

18. The computer-readable storage device of claim 17, wherein the transmission of the second content stream is based on a request from the media device for a higher bit rate stream.

19. The computer-readable storage device of claim 16, wherein the first indication is received via the terrestrial distribution system.

20. The computer-readable storage device of claim 16, wherein the audio content stream comprises a compressed version of audio of the first content stream.

* * * * *